(12) United States Patent
Lu et al.

(10) Patent No.: US 11,586,305 B1
(45) Date of Patent: Feb. 21, 2023

(54) LUMINOUS MOUSE PAD

(71) Applicant: HADES-GAMING CORP., New Taipei (TW)

(72) Inventors: Ho Lung Lu, New Taipei (TW); Shihwei Pan, New Taipei (TW)

(73) Assignee: HADES-GAMING CORP., New Taipei (TW)

( * ) Notice: Subject to any disclaimer, the term of this patent is extended or adjusted under 35 U.S.C. 154(b) by 0 days.

(21) Appl. No.: 17/868,583

(22) Filed: Jul. 19, 2022

(30) Foreign Application Priority Data

Aug. 11, 2021 (TW) .................................. 110129672

(51) Int. Cl.
*G06F 3/039* (2013.01)
*F21V 33/00* (2006.01)

(52) U.S. Cl.
CPC ........ *G06F 3/0395* (2013.01); *F21V 33/0048* (2013.01)

(58) Field of Classification Search
CPC ........................... G06F 3/0395; F21V 33/0048
See application file for complete search history.

(56) References Cited

U.S. PATENT DOCUMENTS 10,859,750 B1 * 12/2020 Lai .................. F21V 33/0048
2019/0113669 A1 * 4/2019 Hong .................. G06F 3/039

FOREIGN PATENT DOCUMENTS

| CN | 114281200 A | * | 4/2022 |
| TW | M500301 U | | 5/2015 |
| TW | M560621 U | | 5/2018 |
| TW | M567407 U | | 9/2018 |
| TW | 202008130 A | | 2/2020 |

OTHER PUBLICATIONS

Taiwan Office Action dated Mar. 11, 2022 as received in application No. 110129672.

* cited by examiner

*Primary Examiner* — Mariceli Santiago
(74) *Attorney, Agent, or Firm* — Maschoff Brennan

(57) ABSTRACT

A luminous mouse pad includes a mat part and a light-guiding structure. The light-guiding structure includes a tube portion; and an insertion portion. The insertion portion protrudes from the tube portion and is inserted into an end side surface of the mat part to leave the tube portion to be exposed outside the mat part.

13 Claims, 7 Drawing Sheets

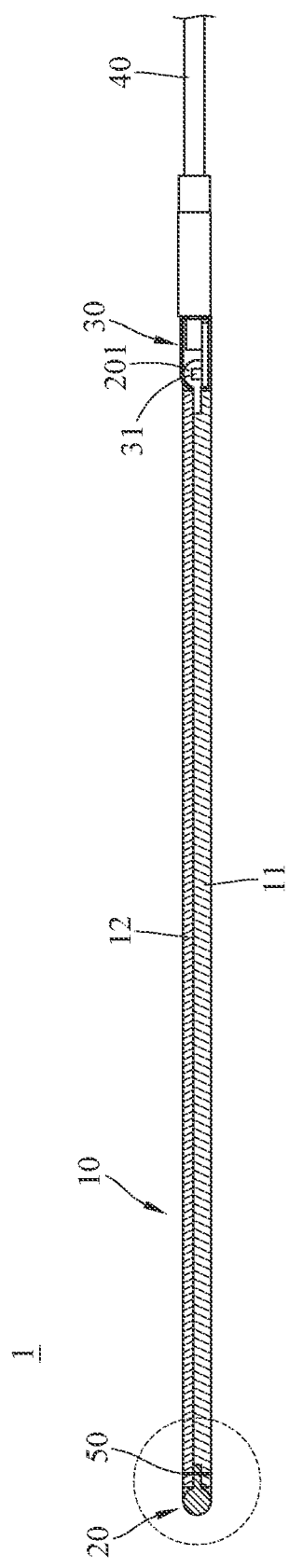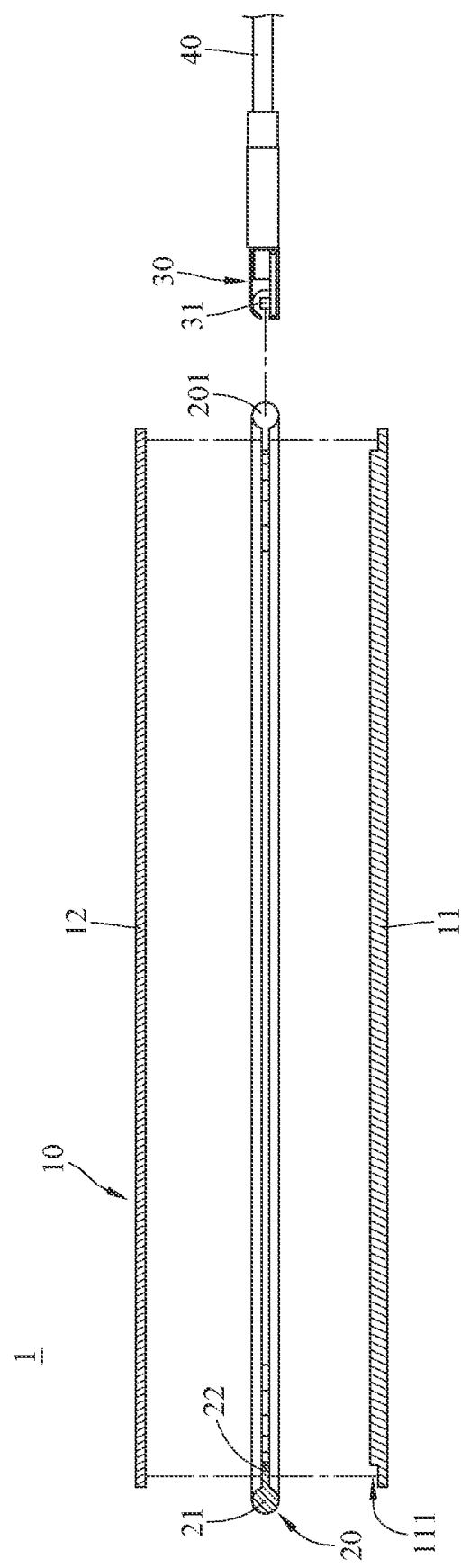

LUMINOUS MOUSE PAD

CROSS-REFERENCE TO RELATED APPLICATIONS

This non-provisional application claims priority under 35 U.S.C. § 119(a) on Patent Application No(s). 110129672 filed in Taiwan (R.O.C.) on Aug. 11, 2021, the entire contents of which are hereby incorporated by reference.

TECHNICAL FIELD

The disclosure relates to a mouse pad, more particularly to a luminous mouse pad.

BACKGROUND

A luminous mouse pad (also known as "light-emitting mouse pad) generally has a bar-shaped light guide at its lateral edge to illuminate when coupling to a power source, such as a computer. Typically, a luminous mouse pad needs thread to stitch the bar-shaped light guide to the edge of the mat part. However, the thread goes along the light-emitting surface of the light guide to result in an uneven surface at the periphery of the mouse pad. This leads to an uncomfortable feeling on the wrist and hand while rubbing or touching the thread. Also, the thread covers the light guide therefore it has to be made of transparent plastic material; however, this type of material is generally hard and will make the discomfort even worse.

SUMMARY

One embodiment of the disclosure provides a luminous mouse pad including a mat part and a light-guiding structure. The light-guiding structure includes a tube portion; and an insertion portion. The insertion portion protrudes from the tube portion and is inserted into an end side surface of the mat part to leave the tube portion to be exposed outside the mat part.

According to the luminous mouse pad as discussed in the above embodiment, the tube portion is fixed to the periphery of the mat part by the insertion portion inserting into the mat part, thus the exposed surface of the light-guiding structure remains smooth so that it will not cause discomfort while the user's wrist or hand is rubbing or touching the periphery of the luminous mouse.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein:

FIG. 3 is a cross-sectional view of the luminous mouse pad according to one embodiment of the disclosure;

FIG. 4 is an exploded cross-sectional view of the luminous mouse pad according to one embodiment of the disclosure;

DETAILED DESCRIPTION

Figure 1:
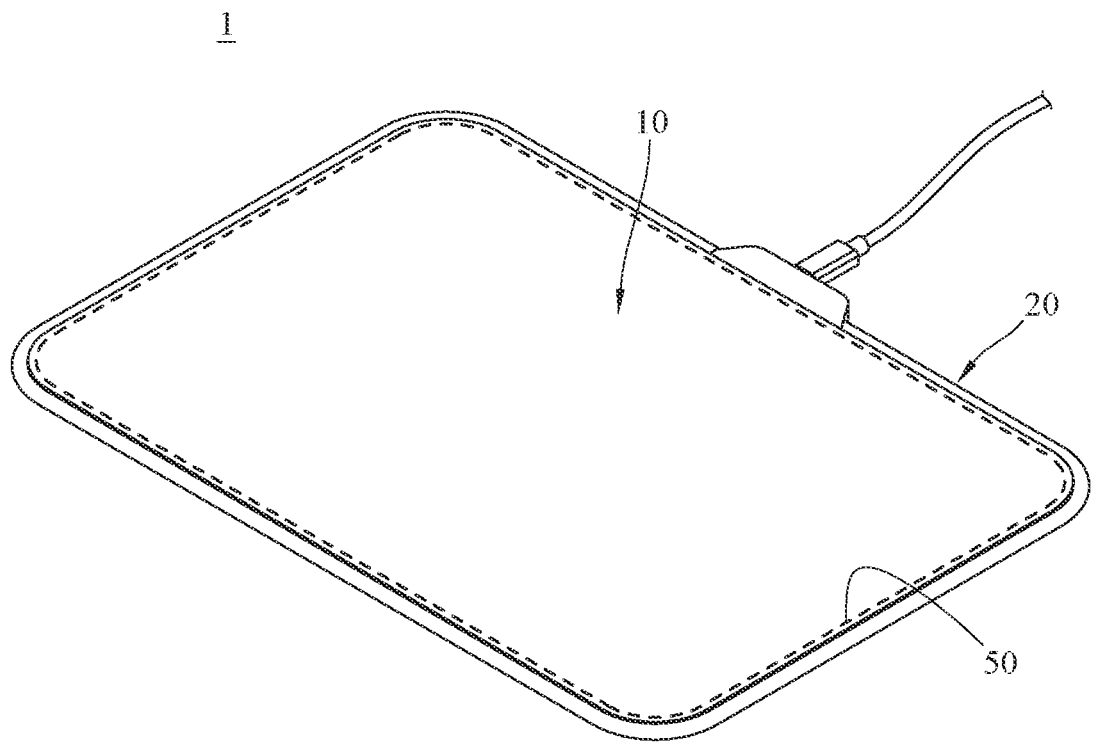
FIG. 1 is a perspective view of a luminous mouse pad according to one embodiment of the disclosure.
Figure 2:
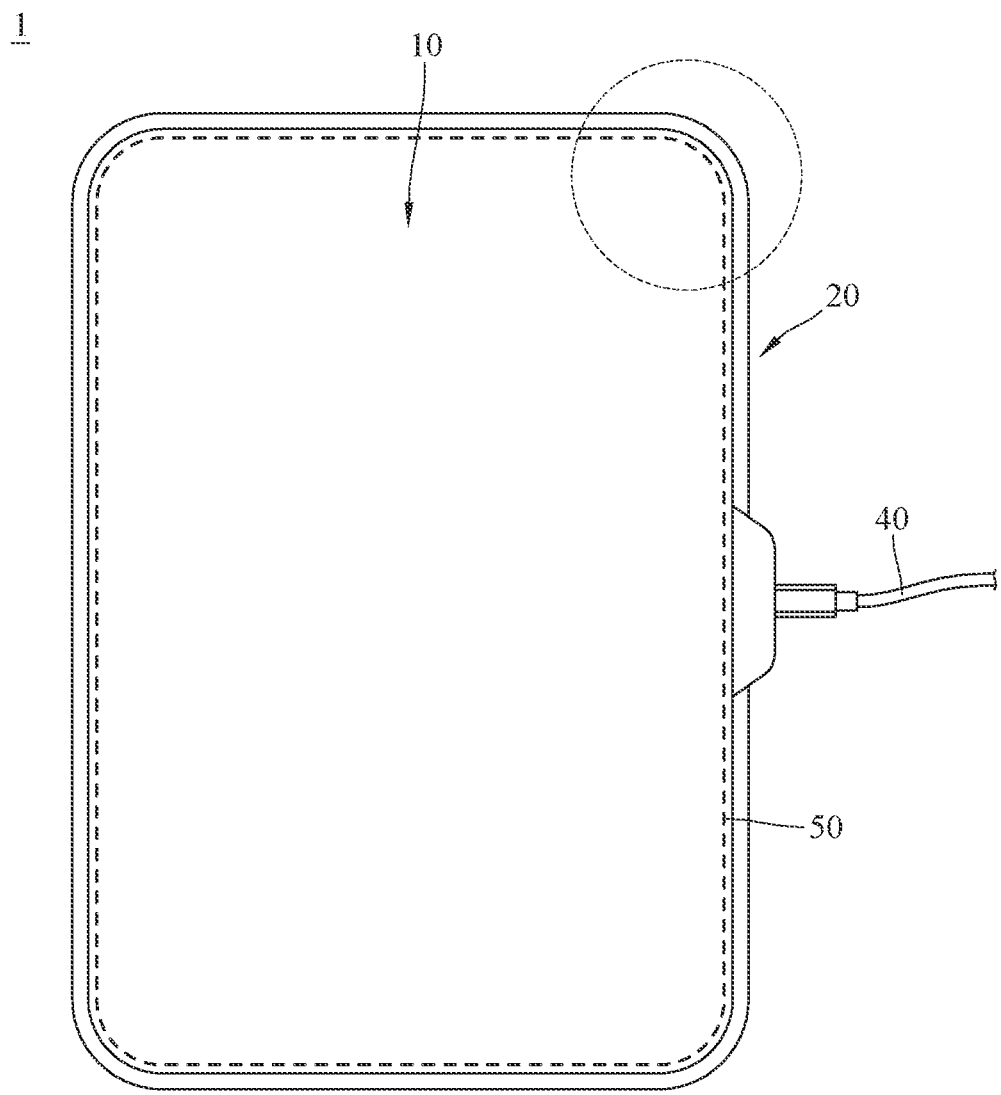
FIG. 2 is a planar view of the luminous mouse pad according to one embodiment of the disclosure.

The following embodiments will be described with reference to the drawings. For the purpose of clear illustration, some features shown in the drawings may be illustrated in a simplified manner or slightly exaggerated but are not intended to limit the disclosure. Unless explicitly stated, the term "at least one" as used herein may mean that the quantity of the described element or component is one or more than one but does not necessarily mean that the quantity is only one. The term "and/or" may be used herein to indicate that either or both of two stated possibilities.

Referring to FIGS. 1-4, a luminous mouse pad 1 is provided. The luminous mouse pad 1 may include a mat part 10 and a light-guiding structure 20. The mat part 10 may be in any suitable shape and may be made of any suitable material to provide an ideal surface for mouse to move properly and precisely. The mat part 10 may include a first layer 11 and a second layer 12 overlapping with the first layer 11. The first layer 11 and the second layer 12 may be adhered or attached to each other using any suitable means, such as adhesive.

The first layer 11 may be made of any suitable material that features anti-slip, such as plastic, rubber, or silicon. The second layer 12 may be made of any suitable material that can provide a smooth, uniform surface for mouse to move, such as Mylar, abrasion resistant fabric, metal, glass.

Figure 5:
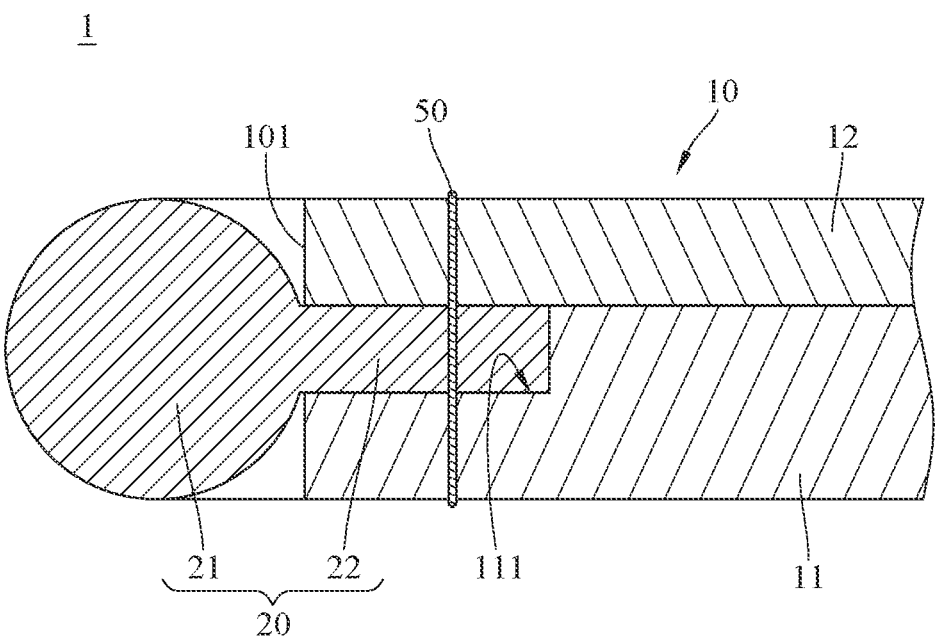
FIG. 5 is a partially enlarged cross-sectional view of the luminous mouse pad according to one embodiment of the disclosure.

Referring to FIG. 5, one or more end side surfaces 101 of the mat part 10 has one or more recesses 111 thereon. As shown, the end side surface 101 may be formed by the end side surfaces of the first layer 11 and the second layer 12, and the recess 111 is located at the end side surface of the first layer 11. In other embodiments, the recess may be formed on the second layer or formed on both the first and second layers.

The light-guiding structure 20 may be integrally formed of a single piece made of light-permeable and flexible material, such as plastic or any typical material for light guide. In this embodiment, the light-guiding structure 20 may include a tube portion 21 and at least one insertion portion 22, the cross-section of the tube portion 21 may be in any suitable shape, the insertion portion 22 protrudes outwards from the tube portion 21 and configured to be inserted into the recess 111. As shown, the insertion portion 22 is located within the recess 111 and clamped by the first layer 11 and the second layer 12, and the tube portion 21 is exposed to the outside of the mat part 10. Thus, the light-guiding structure 20 emits light through the surface of the tube portion 21.

In this embodiment, a thread 50 is provided to stitch on the first layer 11, the second layer 12, and the insertion portion 22 so as to fix the insertion portion 22 to the first layer 11 and the second layer 12.

There may be a light source module 30 attached to one side of the first layer 11. The light source module 30 may receive electricity and electrical signal via a cable 40. The light source module 30 may include one or more light sources 31 (e.g., light-emitting diode) corresponding to at least one end of the light-guiding structure 20 (e.g., an end surface shown in FIG. 3). When the luminous mouse pad 1 is activated, the light source 31 emits light into the tube portion 21 through the end surface 201, and the tube portion 21 guides the light to glow at the periphery of the mat part 10.

The thread 50 is at the insertion portion 22 and the mat part 10, that is, the surface of the tube portion 21 (i.e., the exposed surface of the light-guiding structure 20) is absent of the thread 50, thus the tube portion 21 remains a smooth surface and will not cause discomfort while the user's wrist or hand is rubbing or touching the periphery of the mat part 10. Also, since the surface of the tube portion 21 is absent of the thread 50, the thread 50 has no need to be transparent and hard plastic and may be made of any suitable softer material, such as cotton, linen, nylon, or any typical man-made fiber. This further ensures that the luminous mouse pad 1 will not cause discomfort to the user's wrist or hand.

Note that the thread 50 is optional. In other embodiments, the insertion portion 22 may be fixed to the first layer 11 and the second layer 12 using adhesive but without using the thread 50. Note that the mat part may have more than two layers or may be integrally formed of a single layer.

Figure 6:
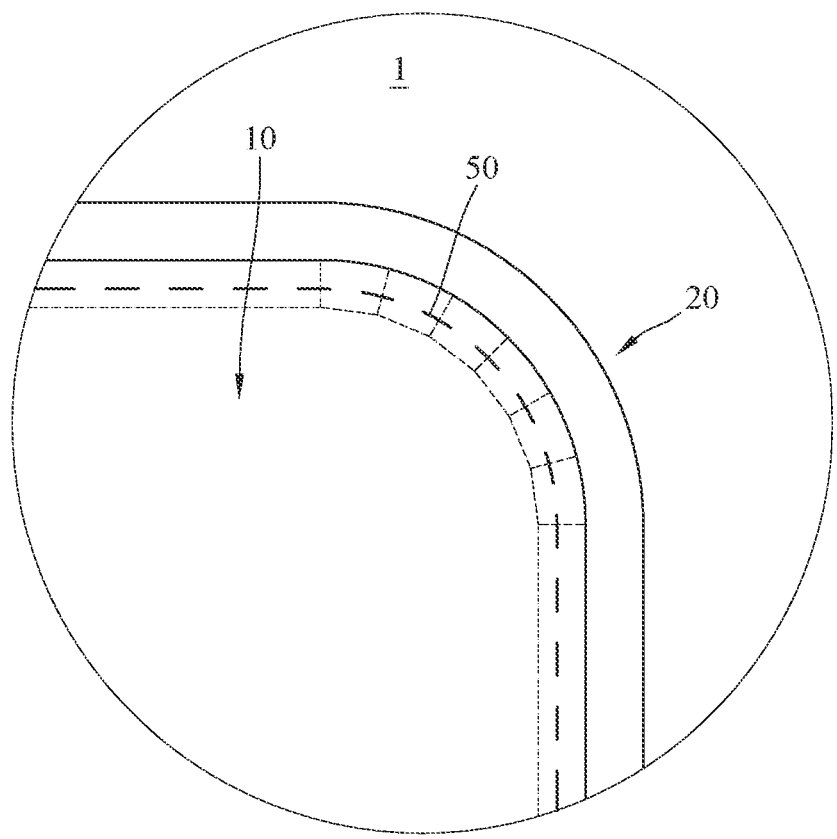
FIG. 6 is a partially enlarged planar view of a corner of the luminous mouse pad according to one embodiment of the disclosure.
Figure 7:
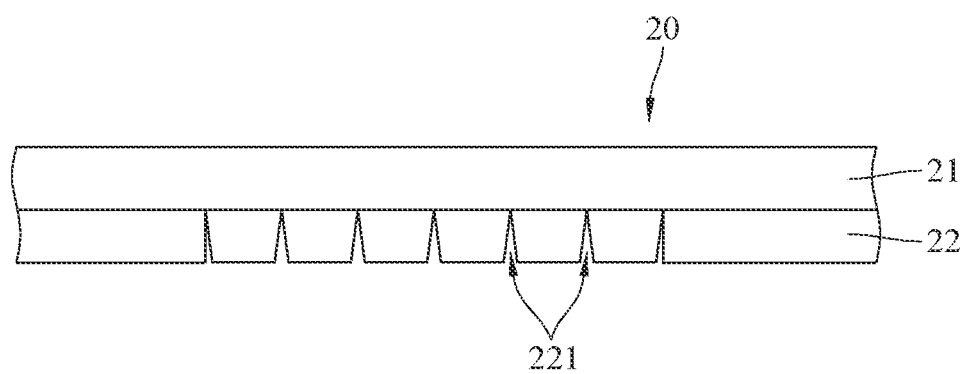
FIG. 7 depicts a partially enlarged view showing the light-guiding structure of the luminous mouse pad not yet being curved.

Referring to FIGS. 6-7, the light-guiding structure 20 may have at least one cut 221 to allow it to be deformed to fit the corners of the mat part 10.

Figure 8:
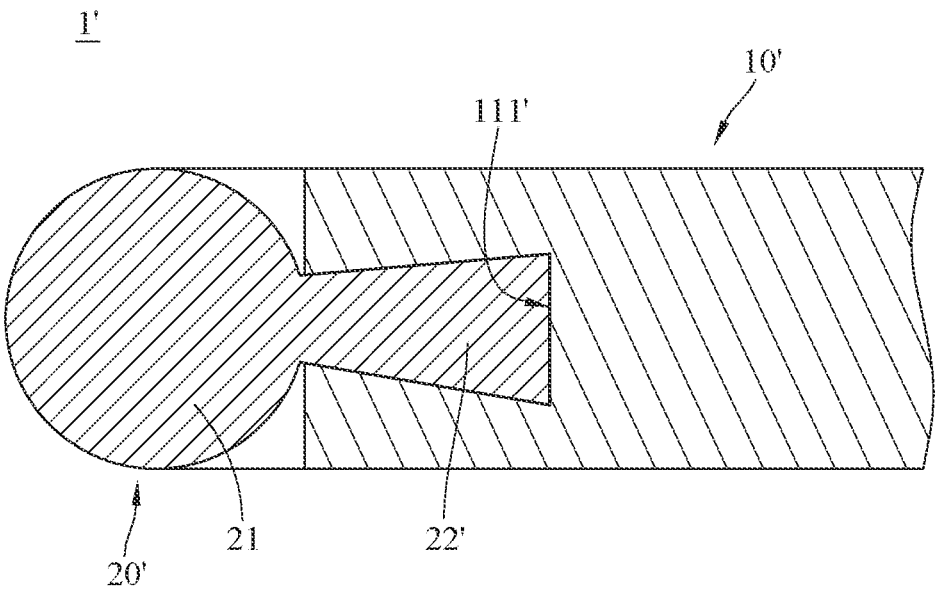
FIG. 8 is a partially enlarged cross-sectional view of a luminous mouse pad according to another embodiment of the disclosure.

Note that the insertion portion 22 and the recess 111 may be in any suitable shape. Referring to FIG. 8, a luminous mouse pad 1' has a light-guiding structure 20' with an insertion portion 22' in a trapezoidal shape, and a recess 111' of a mat part 10' is in a mating trapezoidal shape. The mating shapes of the insertion portion 22' and the recess 111' help strengthen the connection between the light-guiding structure 20 and the mat part 10'. Optionally, the insertion portion 22' and the mat part 10' may be fixed to each other using thread and/or adhesive.

Figure 9:
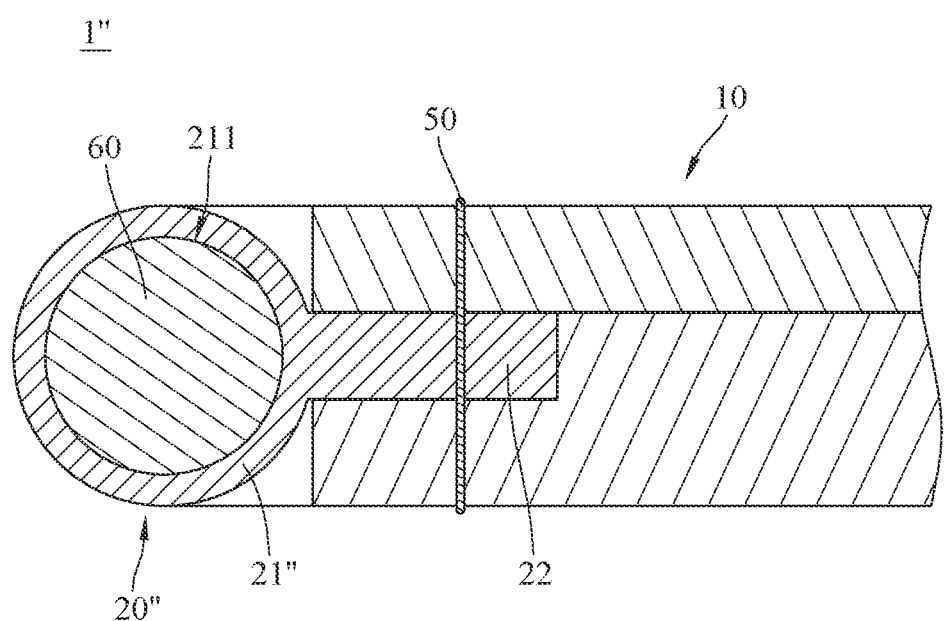
FIG. 9 is a partially enlarged cross-sectional view of a luminous mouse pad according to still another embodiment of the disclosure.

Optionally, referring to FIG. 9, a light-guiding structure 20'' of a luminous mouse pad 1'' may have a hollow tube portion 21'', as shown, the tube portion 21'' has a through hole 211 sized and shaped to accommodate any typical light guide bar (e.g., the light guide bar 60). The light guide bar 60 and the tube portion 21'' both can transmit and guide light.

Figure 10:
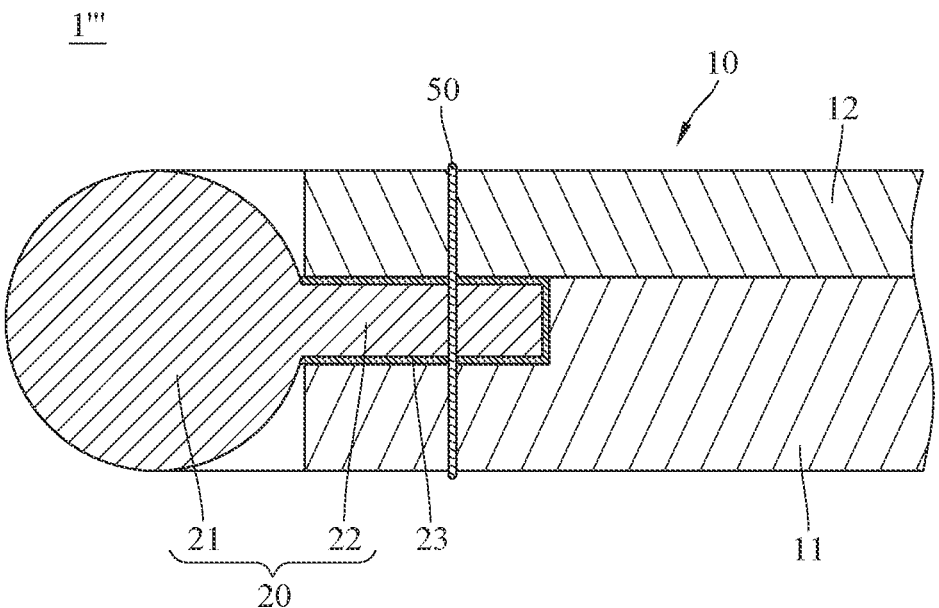
FIGS. 10 and 11 are partially enlarged cross-sectional views of luminous mouse pads according to still yet other embodiments of the disclosure.

Note that the light-guiding structure may be made of composite material or partially colored as required. For example, please see a luminous mouse pad 1''' shown in FIG. 10, when the thread 50 is made of non-transparent material, the arrangement of the thread 50 may be see-through from outside of the light-guiding structure 20. To prevent this, at least part of the surface of the insertion portion 22 may be covered by a colored coating 23, the colored coating 23 may be in a color similar to or the same as that of the thread 50 or in any other suitable colors, which makes the thread 50 more visually blends in the insertion portion 22 and therefore makes the arrangement of the thread 50 less recognizable from outside of the light-guiding structure 20.

Figure 11:
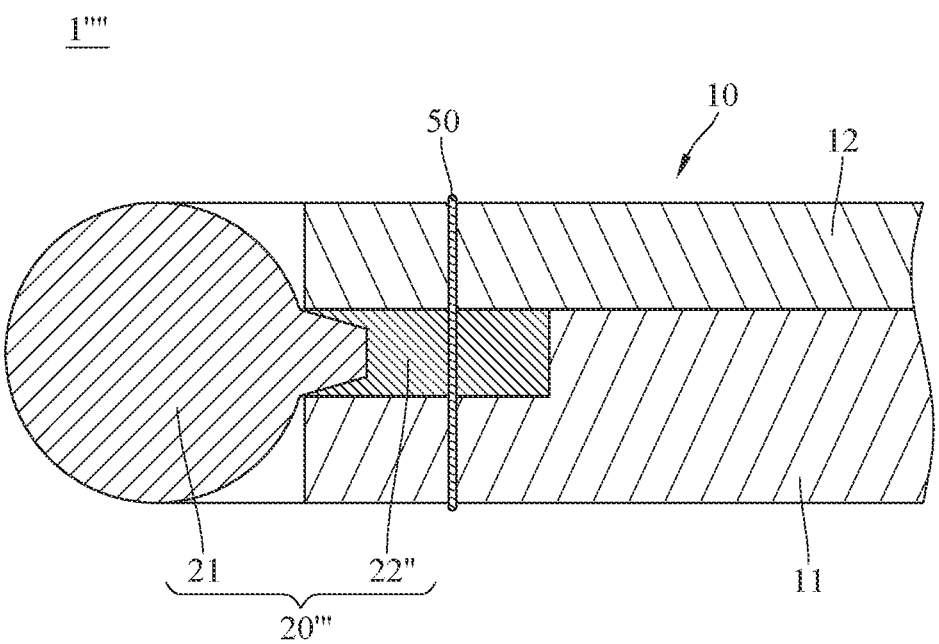

Alternatively, please see a luminous mouse pad 1'''' shown in FIG. 11, an insertion portion 22'' of a light-guiding structure 20''' may be partially or wholly colored or less transparent, which also can make the thread 50 more visually blends in the insertion portion 22'' and therefore also can make the arrangement of the thread 50 less recognizable from outside of the light-guiding structure 20'.

According to the luminous mouse pad as discussed in the above embodiments, the tube portion is fixed to the periphery of the mat part by the insertion portion inserting into the mat part, thus the exposed surface of the light-guiding structure remains smooth so that it will not cause discomfort while the user's wrist or hand is rubbing or touching the periphery of the luminous mouse.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A luminous mouse pad, comprising:
a mat part; and
a light-guiding structure, comprising:
a tube portion; and
an insertion portion, protruding from the tube portion and being inserted into an end side surface of the mat part to leave the tube portion to be exposed outside the mat part.

2. The luminous mouse pad according to claim 1, further comprising a thread stitching on parts of the insertion portion and the mat part overlapping with each other so as to fix the insertion portion to the mat part.

3. The luminous mouse pad according to claim 2, wherein a surface of the tube portion is absent of the thread.

4. The luminous mouse pad according to claim 1, wherein at least the tube portion of the light-guiding structure is light-permeable and flexible.

5. The luminous mouse pad according to claim 1, wherein the light-guiding structure is an integrally formed single piece.

6. The luminous mouse pad according to claim 1, wherein the mat part has a recess located at the end side surface of the mat part, and the insertion portion of the light-guiding structure is located in the recess.

7. The luminous mouse pad according to claim 6, wherein the mat part comprises a first layer and a second layer overlapping with each other, the first layer has the recess, the insertion portion of the light-guiding structure is located in the recess and clamped by the first layer and the second layer.

8. The luminous mouse pad according to claim 6, wherein the recess and the insertion portion are in trapezoidal shape.

9. The luminous mouse pad according to claim 1, wherein the insertion portion has at last one cut located at corners of the mat part.

10. The luminous mouse pad according to claim 1, wherein the tube portion has a through hole configured to accommodate a light guide bar.

11. The luminous mouse pad according to claim 1, further comprising a light source corresponding to an end surface of the light-guiding structure.

12. The luminous mouse pad according to claim 1, wherein at least part of the insertion portion is colored.

13. The luminous mouse pad according to claim 1, wherein a colored coating covering at least part of a surface of the insertion portion.

* * * * *